United States Patent
Dong et al.

(10) Patent No.: US 10,044,664 B2
(45) Date of Patent: Aug. 7, 2018

(54) PREVENTION OF SENDING MESSAGES BY MISTAKE

(71) Applicant: International Business Machines Corporation, Armonk, NY (US)

(72) Inventors: Zhu Ming Dong, Shanghai (CN); HaiFeng Li, Shanghai (CN); Yong Quan Liang, Shanghai (CN); Huapin Shen, Shanghai (CN); Yu Jing Xie, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 14/685,773

(22) Filed: Apr. 14, 2015

(65) Prior Publication Data

US 2015/0312197 A1 Oct. 29, 2015

(30) Foreign Application Priority Data

Apr. 25, 2014 (CN) .......................... 2014 1 0171647

(51) Int. Cl.
| | | |
|---|---|---|
| *G06F 3/048* | (2013.01) | |
| *H04L 12/58* | (2006.01) | |
| *G06F 3/0481* | (2013.01) | |

(52) U.S. Cl.
CPC ............ *H04L 51/28* (2013.01); *G06F 3/0481* (2013.01); *H04L 51/02* (2013.01)

(58) Field of Classification Search
CPC ......... H04L 51/04; H04L 51/26; H04L 51/30; H04L 51/34; H04L 51/03; G06F 21/32; G06F 21/34; G06F 3/0481
See application file for complete search history.

(56) References Cited

U.S. PATENT DOCUMENTS

| | | | |
|---|---|---|---|
| 7,877,454 B1 * | 1/2011 | Hunter | ................. G06Q 10/107 709/206 |
| 8,108,528 B2 | 1/2012 | Jones et al. | |
| 8,135,787 B2 | 3/2012 | Bansal et al. | |
| 8,364,767 B2 | 1/2013 | Brady et al. | |

(Continued)

FOREIGN PATENT DOCUMENTS

| | | |
|---|---|---|
| CN | 102750334 A | 10/2012 |
| CN | 102799589 A | 11/2012 |
| CN | 103684969 A | 3/2014 |

OTHER PUBLICATIONS

IBM, "Recipient Assurance—Detection and Prevention of misdirected messages", An IP.com Prior Art Database Technical Disclosure, Original Publication Date: Mar. 4, 2009, IP.com No. 000180098, IP.com Electronic Publication: Mar. 4, 2009, pp. 1-2.

(Continued)

*Primary Examiner* — Linh K Pham

(74) *Attorney, Agent, or Firm* — Andrew Aubert; David B. Woycechowsky

(57) ABSTRACT

Machine logic implemented techniques for preventing sending messages by mistake (with such "mistakes" including sending a message to an unintended recipient). One embodiment of the technique includes: detecting an intention of sending a message to a target user; responsive to detection of the intention, predicting a risk that the target user is not a desired recipient of the message; and providing a prompt responsive to the predicted risk being higher than a predetermined threshold.

12 Claims, 4 Drawing Sheets

(56) References Cited

U.S. PATENT DOCUMENTS

| | | | | |
|---|---|---|---|---|
| 8,892,672 | B1* | 11/2014 | Rackliffe | H04L 51/32 |
| | | | | 709/206 |
| 2003/0005058 | A1* | 1/2003 | Sorotzkin | G06Q 10/107 |
| | | | | 709/206 |
| 2009/0210497 | A1 | 8/2009 | Callanan et al. | |
| 2010/0318613 | A1* | 12/2010 | Souza | G06Q 10/107 |
| | | | | 709/206 |
| 2011/0055334 | A1 | 3/2011 | Tivyan | |
| 2012/0089686 | A1* | 4/2012 | Meister | G06Q 10/107 |
| | | | | 709/206 |
| 2013/0014285 | A1* | 1/2013 | Sasakura | G06Q 50/01 |
| | | | | 726/29 |
| 2013/0031196 | A1 | 1/2013 | Yan | |
| 2014/0141818 | A1* | 5/2014 | Yoakum | H04L 51/26 |
| | | | | 455/466 |
| 2015/0248389 | A1* | 9/2015 | Kahn | G06F 17/241 |
| | | | | 715/230 |

OTHER PUBLICATIONS

"Adding Useful Identity Information to the Entry Field of Instant Messaging Applications", An IP.com Prior Art Database Technical Disclosure, Authors et. al.: Disclosed Anonymously, IP.com No. 000201818, IP.com Electronic Publication: Nov. 24, 2010, pp. 1-2.

China Patent Application No. 201410171647.0 entitled "Method and System for Preventing Sending Messages by Mistake", filed Apr. 25, 2014.

"System and Method for Watermarking Instant Message Response Area", An IP.com Prior Art Database Technical Disclosure, Authors et. al.: Disclosed Anonymously, IP.com No. 000214756, IP.com Electronic Publication: Feb. 6, 2012, 1 page.

\* cited by examiner

PREVENTION OF SENDING MESSAGES BY MISTAKE

BACKGROUND OF THE INVENTION

Embodiments of the present invention relate to messaging, and more specifically, to a method and system for preventing sending messages by mistake and/or to unintended recipients.

With the development of computer and network technologies, messaging applications have been widely used in daily life and work. The term "messaging applications" here includes any application enabling a user to send and/or receive a message, including, but not limited to, email application, telecommunications message (e.g., short messaging service SMS, multimedia messaging service MMS, instant messaging (IM) application, etc.) The messaging applications have greatly improved efficiency and convenience of daily communication between people.

During use of a messaging application, it is common that one user communicates with multiple different other users simultaneously. At this point, it might occur to accidentally send a message by mistake. Consider a specific example where user A is using an IM application to communicate with user B and user C. During these IM communications with multiple users, user A sends by message to an unintended recipient (which is one form of "sending a message by mistake"). More specifically, in this example, user A intends to send an IM message to user B, but instead sends the message to user C due to a neglect or misoperation.

SUMMARY

According to an aspect of the present invention, there is a method, computer program product and/or system for preventing sending a message by mistake that performs the following operations: (i) detecting, by machine logic, a condition that a sender user is likely to perform actions that will send a message through a communication device and a communication network to at least a first recipient user; (ii) responsive to detection of the condition, determining a risk value corresponding to the risk that the first recipient user is not a desired recipient of the message; and (iii) responsive to the predicted risk being higher than a predetermined threshold, communicating to the sender user, through the communications device, an indication that the user may be in the process of sending the message to an undesired recipient.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

In respective figures, same or like reference numerals are used to represent the same or like components.

DETAILED DESCRIPTION

Figure 1:
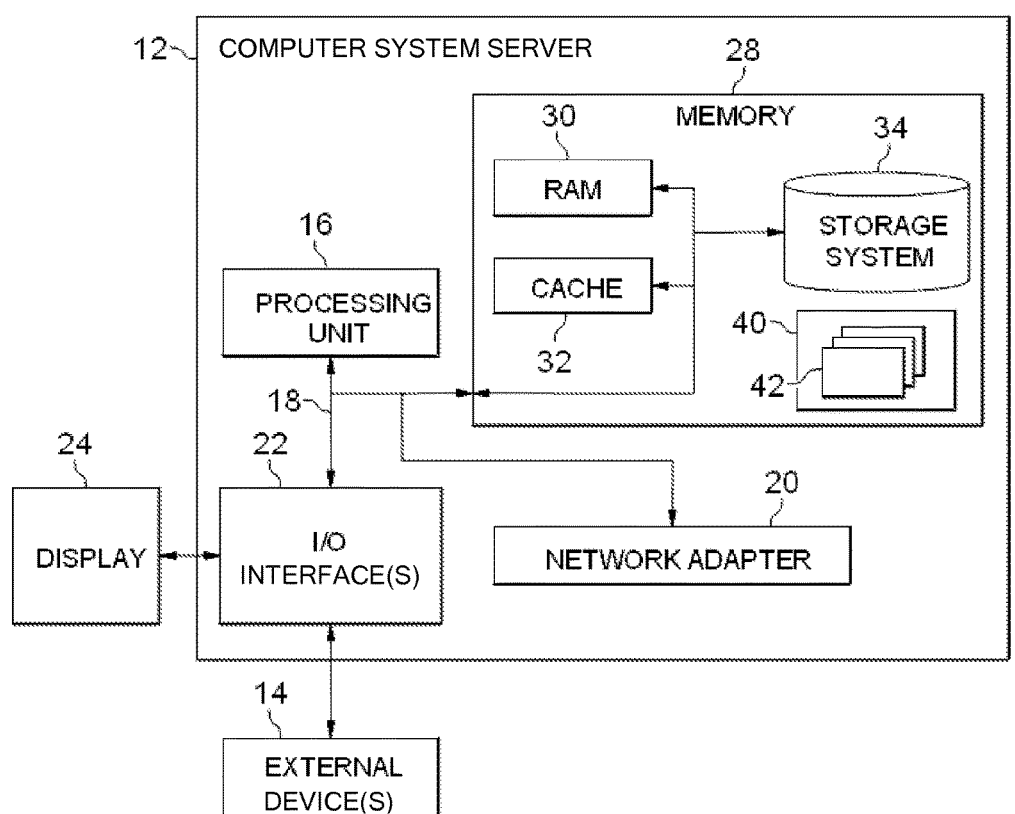
FIG. 1 shows a computer system/server which is applicable to implement the embodiments of the present invention.

Some embodiments will be described in more detail with reference to the accompanying drawings, in which embodiments of the present disclosure have been illustrated. However, the present disclosure can be implemented in various manners, and thus should not be construed to be limited to the embodiments disclosed herein. Rather, the embodiments set forth and discussed in this disclosure are provided for the thorough and complete understanding of the present disclosure, and completely conveying the scope of the present disclosure to those skilled in the art.

Some embodiments of the present invention recognize the following facts, potential problems and/or potential areas for improvement with respect to the current state of the art: (i) in some currently conventional messaging applications, windows for messaging with different users usually have very similar appearance, which increases the risk of sending a message by mistake; (ii) message mistakenly sent (including messages sent to incorrect recipient(s)) always cannot be revoked; (iii) sending a message by mistake might divulge user privacy, interfere with the recipient of a message, or cause embarrassment in human communication; (iv) do not rely upon manual operation of the user to avoid sending a message by mistake; and/or; (v) there is a need for a more effective solution that avoids sending messages by mistake.

With respect to item (iv) in the previous paragraph, a messaging application usually displays identifications of a message recipient in the title bar of a messaging window, e.g., name, nickname, avatar, and the like. The user needs to confirm he/she is communicating with a desired target user through such information before sending a message. However, when the user is communicating using the messaging application, because his/her attention is generally focused on the message and dialogue content, he/she may neglect checking identification information to confirm the recipient identity. Therefore, solutions that rely on manual operations cannot always effectively avoid occurrence of sending a message by mistake.

Some embodiments of the present invention may include one, or more, of the following features, characteristics and/or advantages: (i) provide a technical solution that effectively avoids sending a message by mistake in a messaging application; and/or (ii) provide a method for preventing sending a message by mistake. One embodiment of a method includes the following operations: (i) detecting an intention of sending a message to a target user; (ii) responsive to detection of the intention, predicting a risk that the target user is not a desired recipient of the message; and (iii) providing a prompt responsive to the predicted risk being higher than a predetermined threshold. One embodiment of a system includes: an intention detecting unit configured to detect an intention of sending a message to a target user; a risk predicting unit configured to responsive to detection of the intention, predict a risk that the target user is not a desired recipient of the message; and a prompt unit configured to provide a prompt responsive to the predicted risk being higher than a predetermined threshold.

Some embodiments of the present invention may include one, or more, of the following features, characteristics and/or advantages: (i) intelligent detection, by machine logic, of whether a user has an intention of messaging; (ii) mistaken message sending detection does not necessarily depend on the content of the message per se; (iii) when an intention of sending a message to a particular target user is detected, it may be automatically predicted whether the target user is a desired recipient of the to-be-sent message based on various factors; (iv) if it is predicted that there is a high risk that the target user is not a desired recipient, according to some embodiments, the system provides, by machine logic, a real-time prompt to the user attempting to send the message in a manner sufficiently attracting the intention of the user; (v) avoids excessive interference with the user's normal interaction; and/or (vi) the prompt to the user can be realized in a timely, accurately and user-friendly manner, thereby avoiding a potential mistake in sending a message. Other possible features and advantages of the present invention will become more comprehensible through the depiction below.

Referring now to FIG. 1, in which an exemplary computer system/server 12, which is applicable to implement the embodiments of the present invention, is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing unit 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, the embodiments of the present invention will be described in detail. As mentioned above, some embodiments do not necessarily depend on the content of a message per se.

Some embodiments of the present invention may include one, or more, of the following features, characteristics and/or advantages: (i) when an intention of a user to send a message to a particular target user is detected, a risk that the target user is not a desired recipient of the to-be-sent message (that is, there is a risk in sending the message by mistake), this may be predicted automatically by machine logic based on various factors; (ii) such prediction may be implemented through various manners, including, but not limited to, social relationship between users, messaging context, messaging content and/or any other appropriate factors; (iii) if there is a high risk that the target user is not the anticipated recipient, according to some embodiments, machine logic provides a real-time prompt to the user in a manner sufficiently attracting the user's attention, and meanwhile it avoids an excessive interference with the user's normal interaction; and/or (iv) a prompt to the user may be implemented in a timely, accurate and user-friendly manner, thereby avoiding potential mistake in sending a message.

Figure 2:
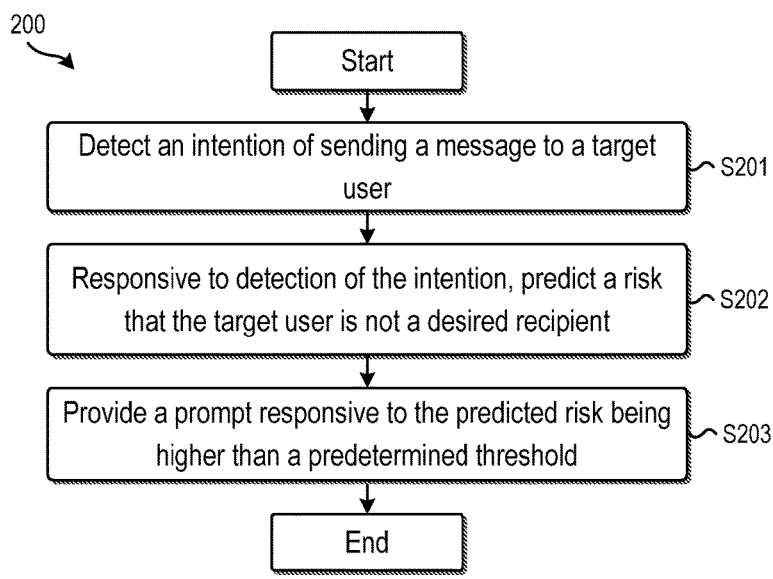
FIG. 2 shows a flow chart of a method for preventing sending a message by mistake according to an embodiment of the present invention.

Now refer to FIG. 2, which shows a flow chart of a method 200 for preventing sending a message by mistake according to an embodiment of the present invention. Method 200 may be used in conjunction with any currently known or future developed messaging applications. The examples of messaging applications include Email, IM, SMS, MMS applications, etc. In the following description, it is likely to use IM application as an example of messaging application. However, it should be understood that it is only illustrative, not intended to limit the scope of the present invention in any manner.

At step S201, an intention of a user of a messaging application to send a message to another user (called "target user") is detected. According to some embodiments of the present invention, the intention of sending a message may be detected through any appropriate manner.

As an example, it is known that when a user desires to communicate with the target user, he/she may create a messaging window associated with the target user. For example, a user attempting to send a message may create such a messaging window by clicking onto an icon or other control corresponding to the target user in the message application. Therefore, in some embodiments, it may be detected at step S201 whether the messaging window associated with the particular target user is created. If such a window is created, it may be regarded that there is an intention of sending a message to the target user associated with the messaging window.

Alternatively or additionally, in some embodiments, detecting the messaging intention at S201 may include detecting an interacting focus that is switched to a messaging window associated with the target user. An example of a focus includes, but not limited to, a cursor of a pointing device such as mouse, a touch point on a touch-sensitive display or a touch device surface, etc. If it is detected that a messaging window obtains the focus, it may be regarded that there is an intention of sending a message to the target user associated with the messaging window.

Alternatively or additionally, in some embodiments, detecting the messaging intention at S201 may include detection of whether content of the message is input in a messaging window. The "content" here may include text, voice, image or other appropriate content. If it is detected that the user inputs content of the message to a certain messaging window, then it may be regarded that there is an intention of sending a message to a target user associated with the messaging window.

Alternatively or additionally, in some embodiments, detecting the messaging intention at step S201 may comprise detecting whether identification information associated with the target user is input into a messaging window associated with the messaging application. It may be understood that when using the messaging application, the user attempting to send a message may first create a "blank" window for messaging, and then associate the window with the target user by inputting identification information associated with a certain target user in a designated field or area of the window. For example, in an email application, the user attempting to send a message may first create a new email window by clicking onto a "create" button, and then input the address or name of the target user in the "recipient" field of the window. For another example, a user attempting to send a message may create a messaging window of an SMS or MMS application, and then input the target user's cell phone number, contact list name, etc. when it is detected that the identification information of the target user is input, it may be regarded that there is an intention of sending a message to the target user.

It should be understood that the above detection of the messaging intention is only exemplary, rather than limiting the embodiments of the present invention in any manner. On the contrary, any technology capable of detecting a desire or possibility of sending a message to a target user falls within the scope of the present invention, regardless of whether such technology is currently known or developed in the future.

If an intention of sending a message to a target user is detected at step S201, the method 200 proceeds to step S202 to predict a risk that the target user is not a desired recipient of the to-be-sent message. According to some embodiments of the present invention, such risk may be predicted or estimated through various appropriate manners.

For example, in some embodiments, the above risk may be predicted at step S202 based on a social relationship between the user attempting to send the message and the target user. Generally speaking, According to some embodiments of the present invention, if the user attempting to send a message and the target user have a close social relationship, then there is a low risk that the target user is not a desired recipient. On the contrary, if the user attempting to send the message has a relatively alienated social relationship with the target user, then there is a high risk that the target user is not a correct desired recipient. According to some embodiments of the present invention, the social relationship between two users may be determined through various manners.

For example, in some embodiments, a user of a messaging application may group different users. For example, "friends" in an IM application, "contacts" in an Email application, and the like, can all be grouped. Corresponding, the grouping information may be used to determine a social relationship between users. As an example, it may be regarded that the user has a relatively close social relationship with target users within groups like "relatives," "friends," and the like, but has a relatively alienated social relationship with target users within groups like "colleagues," "classmates" and the like. Alternatively or additionally, in some embodiments, the user may explicitly indicate his/her social closeness with a specific target user.

As another example, in some embodiments, the social relationship between the user attempting to send the message and the target user may be determined based on the number of their common friends. In particular, for two users, if the number of their common friends exceeds a predefined threshold, it can be determined that these two users are close to each other. On the contrary, if the number of common friends of two users is below the predefined threshold, it is possible to determine that these two users are relatively alienated.

It should be understood that the above technology for determining a social relationship between users is only exemplary, not intended to limit the embodiments of the present invention in any manner. Any technology capable of determining the social relationship between users falls within the scope of the present invention, regardless of whether this technology is currently known or future developed.

Besides the social relationship, or alternatively, at step S202, a risk that the target user is not a desired recipient of the to-be-sent message may be predicted based on the context of the messaging between the user attempting to send the message and the target user.

In some embodiments, the context of messaging may, for example, include historical messaging frequency between the user attempting to send a message and the target user. For example, the number of messages communicated between the two users in a previous period of time may be determined. If the number is greater than a predetermined threshold, it may be regarded that there is a relatively low risk that the target user is not a desired recipient of the current message.

Alternatively or additionally, in some embodiments, the context of messaging may include a messaging continuity between the user attempting to send a message and a target user. Specifically, if it is determined that the user attempting to send a message is continuously participating in a messaging session with the target user, then it may be regarded that the message currently to be sent is very likely to be sent still to the target user. Correspondingly, there is a relatively low risk that the target user is not a desired recipient of the current message. On the other hand, if the user attempting to send a message previously interrupted his/her messaging session with the target user, and relatively little time has passed since a user returned to a given session (for example, less than a predetermined threshold time), it may be determined by machine logic that there is a risk that the recipient user is not the correct intended recipient user for the current message, i.e., the risk of sending a message by mistake is relatively high.

It is to be understood that in the above various embodiments of risk prediction, the machine logic controlling determination of risk of an incorrect, or "mistaken," message not necessarily rely on the substantive content of the message being evaluated for risk. Such a practice is potentially advantageous, because before the sender user has even begun inputting the content of the message, the machine logic can begin to evaluate risk and perform a subsequent action in the fastest way.

Alternatively or additionally, in the risk prediction at S202, of the substantive content of the message may be considered. For example, in some embodiments, it may be detected whether the input message content includes predetermined "sensitive words," e.g., the banking card number, password, personal information, etc. If the message content includes such information, the risk level may be raised to correspondingly enhance security.

Particularly, in some embodiments, the risk that a target user is not a desired recipient may be predicted based on the message content currently inputted by the user attempting to send a message and historical contents between the user and the target user. Specifically, in such an embodiment, at least one key word may be extracted from content of a message. The keyword may be pre-defined and stored. Further, the historical contents communicated between the user attempting to send a message and the target user may be obtained. Such a historical content, for example, may be stored locally or on a server by the messaging application. Next, relevance between the message currently input by the user and the historical content may be determined based on the extracted at least one keyword and obtained historical message content. For example, if the historical message content includes keywords identical or similar to the extracted keyword, the machine logic controlling risk evaluation may determine that the relevance of the keywords is relatively high. For another example, semantic analysis may be performed on the message currently being input by the sender user and on the historical content of the current message undergoing risk evaluation so as to determine a degree semantic similarity between the current message and previous messages to the (perhaps incorrectly) denominated recipient user(s).

It should be understood that the above technologies of determining relevance between a current message and historical messages are only exemplary, not intended to restrict the embodiments of the present invention in any manner. On the contrary, any technology capable of determining relevance between messages falls within the scope of the present invention, regardless of whether this technology is currently known or future developed.

In particular, in some embodiments, the risk predicted at step S202 may also be set at a predetermined level by the sender user when certain preconditions (for example, certain recipient user(s)). For example, the sender user may set a mistaken sending risk to zero for certain recipient users (for example, recipient users for whom receiving a mistaken message would not cause substantial problems). For example, for these target (or "recipient") users, the messaging application may be set to always disable actions responsive to a high evaluated risk (such as, the prompt function mentioned above). On the contrary, a mistaken sending risk correlated with some other target users may be set by the sender user to a relatively high level. For example, the messaging application may be set to always enable the prompt function with respect to these target users. The embodiments in this aspect will be described below.

According to some embodiments of the present invention, at step S202, the above or any other factors may be used separately to predict a risk that the target user is not a desired recipient. Alternatively, one or more of these factors may be combined through any appropriate manner. For example, in some embodiments, a risk may be quantitatively predicted based on various factors to obtain a group of risk scores. Then, these risk scores mat be averaged (e.g., weighted average), and the resulting average value may act as the final risk score yielded by the risk evaluation of the controlling machine logic. Alternatively, the risk score may also be normalized, e.g., into a range between zero and one.

With further reference to FIG. 2, at step S203, the risk predicted at step S202 may be compared with a predetermined threshold. As stated above, in some embodiments, the risk may be a quantitative risk score. In such an embodiment, the predetermined threshold may be a predefined numerical value. Alternatively, the risk may also be expressed qualitatively, e.g., "very high," "high," "medium," "low," "no risk," etc. At this point, the risk threshold may be one of these risk levels, e.g., "medium."

If the risk that the target user is not a desired recipient, the message sending and receiving may be performed regularly without prompt (not shown in the Figure). Otherwise, responsive to determining that the risk of sending a message by mistake as predicted at step S202 is higher than the predetermined threshold, then a prompt may be provided at step S203.

According to some embodiments of the present invention, prompt to the user attempting to send a message may be implemented in various manners. For example, in some embodiments, a prompt to the user may be realized by playing a sound, vibrating the messaging window, popping out a dialogue box, etc. The content of the prompt may include identification information of the target (or "recipient") user, e.g., name, nickname in the messaging application, etc.

Figure 3:
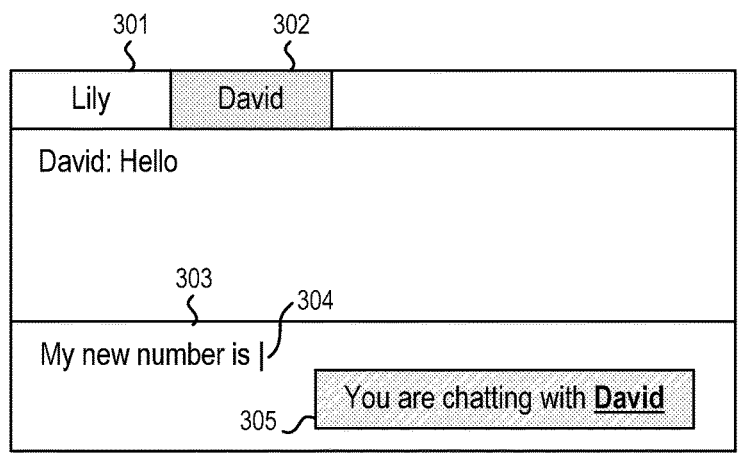
FIG. 3 shows a schematic diagram of a prompt function according to an embodiment of the present invention.

In particular, in order to make the prompt manner sufficiently attractive but not excessively interfere with the user attempting to send a message, in some embodiments, the prompt may be provided by highlighting the identification information of the target user near to the current focus. The identification information of the target user may be highlighted by various means such as a particular color, font, size, bold, underline, flicker, etc., thereby attracting the attention of the sender user. FIG. 3 shows a schematic diagram of such an exemplary embodiment.

In the example shown in FIG. 3, suppose that the initial user uses a messaging window 301 of an IM application to message with a target user Lily. The user then switches from the messaging window 301 to a messaging window 302 associated with another target user David and inputs a message within a message input area 303 of the window 302. At this point, According to some embodiments of the present invention, because the window 302 becomes the focus and the sender user inputs message content to the area 303, the intention of the sender user to send a message will be detected. Because the sender user has just switched from the session with Lily to the session with David, the sender user's continuity in messaging with David is relatively low. Correspondingly, the risk that David is not the desired recipient is predicted to be relatively high (namely, the message to be sent by the user might still take Lily as the desired recipient). At this point, according to some embodiments of the present invention, a floating prompt 305 is displayed nearby where the mouse cursor 304 is currently located. The prompt 305 at least includes identification information of the current target user, e.g., "you are now chatting with David." In this example, the username "David" of the target user is highlighted (bold, underlined). In this way, the user may be prompted intuitively regarding with whom the sender user is now chatting, thereby avoiding a potential mistake in sending a message.

According to some embodiments of the present invention, a prompt to the user may be terminated in any appropriate manner. For example, this kind of prompt may autonomously disappear after a predetermined period of time. Alternatively or additionally, this prompt may also end responsive to a user command or action. For example, the user may click onto a mouse button or press on a particular button on the key (e.g., "ESC" key) to indicate that the target user is actually an anticipated recipient, such that the prompt disappears correspondingly. For another example, if the sender user is aware, through the prompt, that the recipient user has been incorrectly denominated through the sender user's interface, the sender user may switch, or close, the messaging window. At this point, prompt may also be terminated.

Figure 4:
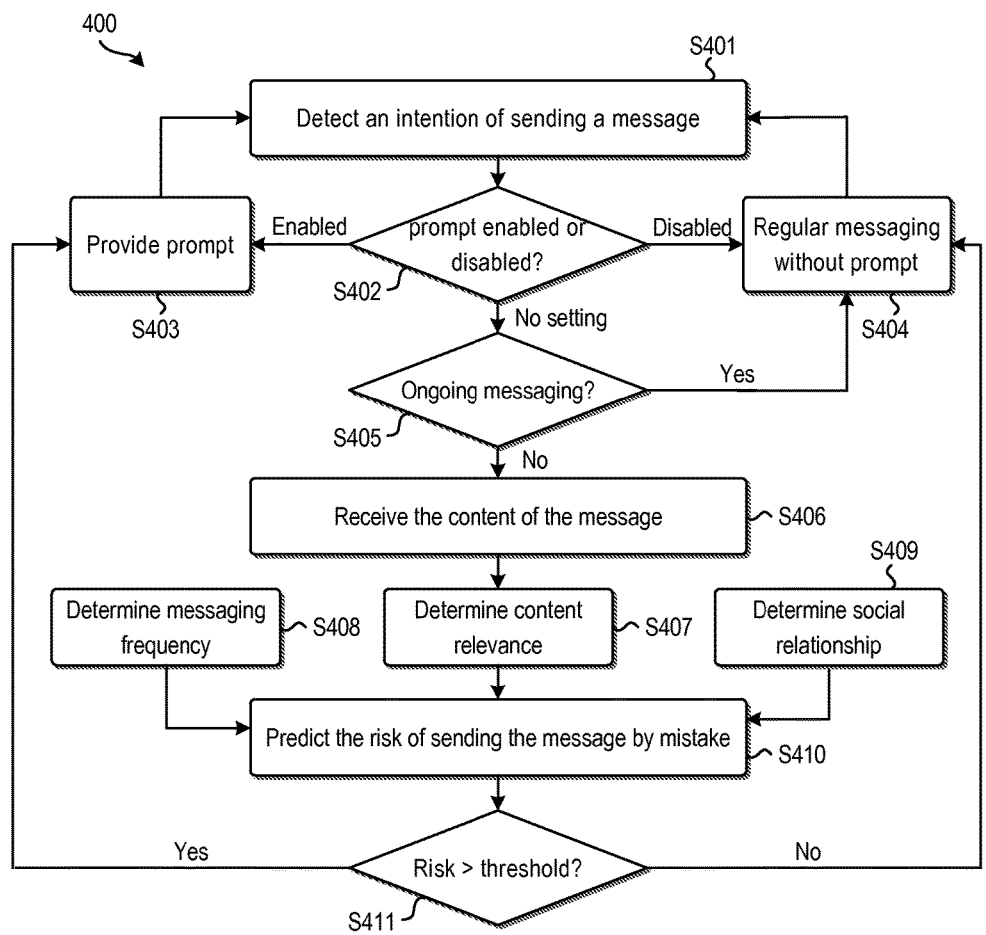
FIG. 4 shows a flow chart of a method for preventing sending a message by mistake according to an embodiments of the present invention.

FIG. 4 shows a flow chart of a method 400 for preventing by mistake sending a message according to an exemplary embodiment of the present invention. It may be understood that the method 400 is an exemplary implementation of the method 200 described above with reference to FIG. 2.

At step S401 of the method 400, an intention of sending a message to a target user is detected. Step S401 corresponds to step S201 in method 200 as described above with reference to FIG. 2, which will not be detailed here.

In particular, in the embodiment of method 400, a user attempting to send a message may appoint always enabling or disabling a prompt function for a specific target user, as described above. Correspondingly, at step S402, it is judged whether always enabling or disabling the prompt function for the current target user has been set. If it is determined that always prompt a target user (branch "enable") for the current target user has been set at step S402, the method proceeds to step S403 to provide a prompt, e.g., highlighting the identification information of the target user. Then, the method 400 may return to step S401 to continue detecting an intention of sending a message.

Otherwise, if it is determined that always not prompting the current target user (branch "disable") has been set at step S402, the method 400 proceeds to step S404 to message regularly without prompt. After step S404, the method 400 may likewise return to step S401 to continue detecting the intention of sending a message.

If it is determined at step S402 that the user attempting to send a message does not make any particular setting with respect to the current target user (branch "no setting"), the method 400 proceeds to step S405 of determining whether the user attempting to send a message continuously messages with the target user. If so, the method 400 proceeds to step S404 to message regularly without any prompt. It is seen that in this embodiment, the continuity of messaging between the user attempting to send a message and the target user has the highest priority or weight. In other words, as long as the messaging proceeds continuously, it is regarded that there is no risk of sending a message by mistake, and therefore it is unnecessary to provide any prompt.

Otherwise, if it is determined at step S405 that the user attempting to send a message just starts or returns to messaging with the target user (e.g., the time for switching to a corresponding messaging window is less than a predetermined threshold), the method 400 proceeds to step S406 along the branch "no," where the input message content is received. The method then proceeds to step S407, where the relevance between the currently input message and the historical contents communicated within the messaging window is determined.

At step S408, messaging frequency (which is a kind of messaging context) between the user attempting to send a message and the target user is determined. At step S409, a social relationship between the user attempting to send a message and a target user is determined, e.g., based on friend group where the target user is located, etc.

Specific implementations of steps S406/S407, S408 and S409 have been described above, which will not be detailed here. Particularly, it should be understood that According to some embodiments of the present invention, the execution sequence of steps S406/S407, S408 and S409 is not restricted. They may be executed in any appropriate time sequence and in some embodiments, may be executed concurrently. The scope of the present invention is not limited thereto.

Next, at step S410, the content relevance obtained at step S407, the communication frequency obtained at step S408, and the social relationship obtained at step S409 may be combined to predict a risk of sending a message by mistake. For example, in some embodiments, content relevance, communication frequency, and social relationship may have a corresponding score, respectively. In such embodiments, these scores may be weight averaged to obtain a risk score. According to some embodiments of the present invention, the weights for different influence factors may be defined in advance. In particular, in this example, messaging continuity (step S405) and the messaging frequency (step S408), which are also part of the messaging context, also have different weights.

Then, at step S411, it is determined whether the risk predicted at step S410 is greater than a predetermined threshold. If the risk is greater than a predetermined threshold (branch "Yes"), the method proceeds to step S403 to provide a prompt. Otherwise, if the risk predicted at step S410 is less than a predetermined threshold (branch "No"), the method 400 proceeds to step S404, where messaging is performed regularly without any prompt.

Figure 5:
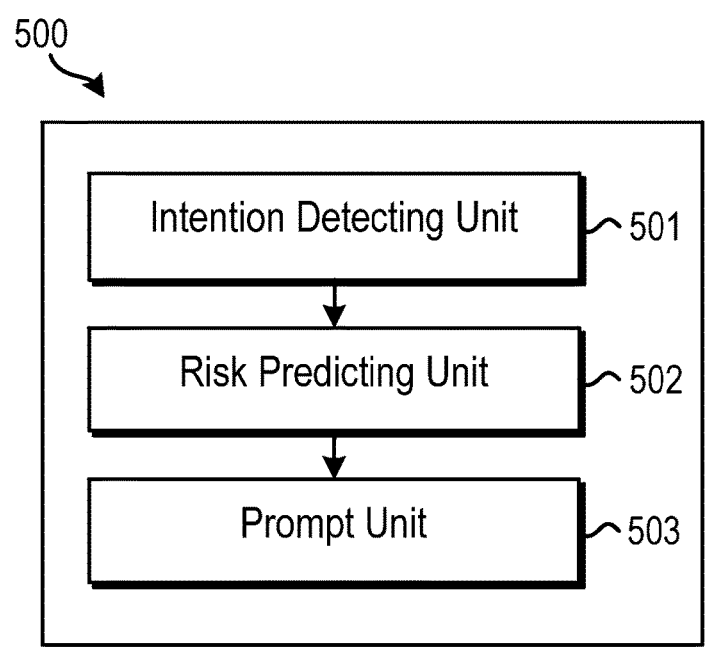
FIG. 5 shows a block diagram of a system for preventing sending a message by mistake according to an embodiment of the present invention.

FIG. 5 shows a block diagram of a system 500 for preventing sending a message by mistake According to some embodiments of the present invention. As shown, According to some embodiments of the present invention, the system 500 comprises: an intention detecting unit 501 configured to detect an intention of sending a message to a target user; a risk predicting unit 502 configured to responsive to detection of the intention, predict a risk that the target user is not a desired recipient of the message; and a prompt unit 503 configured to provide a prompt responsive to the predicted risk being higher than a predetermined threshold.

In some embodiments, the intention detecting unit 501 may comprise at least one of the following: a window creation detecting unit configured to detect whether a messaging window associated with the target user is created; a focus switching detecting unit configured to detect whether a focus is switched to the messaging window associated with the target user; a message input detecting unit configured to detect whether the message is input to the messing window input associated with the target user; and an identification input detecting unit configured to detect whether identification of the target user is input to the messaging window.

In some embodiments, the risk predicting unit 502 may comprise: a social relationship-based predicting unit configured to predict the risk based on a social relationship between the user attempting to send a message and the target user.

Alternatively or additionally, the risk predicting unit may comprise: a messaging context-based prediction unit configured to predict the risk based on message context between the user attempting to send a message and the target user. In some embodiments, the messaging context includes at least one of the following: historical messaging frequency between the user attempting to send a message and the target user; and continuity of current messaging between the user attempting to send a message and the target user.

Alternatively or additionally, in some embodiments, the risk predicting unit 502 may comprise: a content-based predicting unit configured to predict the risk based on content of the message. In particular, in some embodiments, the system 500 may also comprise: a keyword extracting unit configured to extract at least one keyword from the content of the message, and historical content obtaining unit configured to obtain historical content as messaged between the user attempting to send a message and the target user. In this embodiment, the content-based prediction unit may be configured to predict the risk based on relevance between the at least one keyword and the historical content.

In some embodiments, the prompt unit 503 may comprise: an identification highlighting unit configured to highlight identification information of the target user nearby the current focus so as to provide the prompt.

Please note that for the sake of clarity, FIG. 5 does not show optional units or subunits comprised in system 500. However, it should be understood that all features and operations as depicted above are suitable for system 500, respectively, which will not be detailed here. Moreover, partition of the units or subunits in system 500 is not limitative, but exemplary, intended to logically describe its main functions or operations. A function of a unit may be implemented by a plurality of units; otherwise, a plurality of units may also be implemented by a unit. The scope of the present invention is not limited in this aspect.

Moreover, the units comprised in system 500 may be implemented in various manners, including software, hardware, firmware or any combination thereof. For example, in some embodiments, the system 500 may be implemented by software and/or firmware. Alternatively or additionally, the system 500 may be implemented partially or completely based on hardware. For example, one or more units in the system 500 may be implemented as integrated circuit (IC) chip, application-specific integrated circuit (ASIC), a system on chip (SOC), and a field programmable gate array (FPGA), etc. The scope of the present invention is not limited in this aspect.

The phrase "a condition that a sender user is likely to perform actions that will send a message" will now be discussed. In some embodiments this means that the sender user has taken all actions normally required to send the message (absent the mistake-risk analysis and responsive actions according to the present invention), but machine logic automatically prevents actually sending the message in any irretrievable way until the sender user has had an opportunity to receive an indication of a possible unintended recipient and to stop the sending if there is an unintended recipient. In other embodiments, the above-quoted phrase means that the sender user has not taken all actions needed to send the message, even absent the risk evaluation and response according to the present invention.

The phrase "responsive to the predicted risk being higher than a predetermined threshold" will now be discussed. This language means that not every sending of a message, by the sender user, will elicit a response, but, rather, some apparently-planned messages will and others won't. As mentioned above, a sender user may, in some embodiments of the present invention, may make a manual configuration so that a given set of recipient user(s) is always subject to flagging as a possible unintended recipient. However, even in those embodiments, there would be other recipient users who would sometimes have their messages flagged, and other times not flagged, depending upon the risk evaluation according to the present invention.

The phrase "an indication that the user may be in the process of sending the message to an undesired recipient" will now be discussed. The indication may be any type of visual, auditory, tactile or other human understandable kind of "indication," whether of a type now known, or to be developed in the future.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Lowtalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving user input indicating that a user should receive unintended recipient notifications to avoid sending a message by mistake;

receiving a dialogue context data set including information indicative of context of a chat dialogue of a current chat session between the user and a target user, information indicative of a relationship between the user and the target user, and information indicative of a frequency of communication between the user and the target user;

receiving, from the user, a user message data set in the form of a human understandable language message proposed to be sent from the user to the target user as part of the current chat session;

detecting, by machine logic, a condition of the current chat session that the user likely intends to perform actions that will send a message through a communication device and a communication network to the target user;

responsive to detection of the condition, determining, by machine logic, a risk level value indicative of how likely that the target user is to be an unintended recipient with respect to the human understandable language message of the target user input based, at least in part, upon the dialogue context data set;

determining, by machine logic, that the risk level value is higher than a predetermined threshold;

responsive to the determination that the risk level value is higher than a predetermined threshold, presenting the user, through the communication device and the communication network, a notification including information indicating that the user may be in the process of sending the user message data set to an unintended recipient based, at least in part, on the determined risk level value; and stopping the sending of the user message data set to the target user based, at least in part, on the notification;

wherein:

the risk level value is one of: (i) qualitative, or (ii) quantitative;

the qualitative risk level value is a value from the following list: (i) no risk, (ii) low, (iii) medium, (iv) high, (v) very high; and the quantitative value is a numerical value indicative of likelihood of the target user being an unintended recipient.

2. The method of claim 1 wherein the determining that the target user is likely to be an unintended recipient further includes extracting keywords from the human understandable language message of the target user input and the dialogue context data set and comparing the keywords from each source for similarity.

3. The method of claim 1 wherein the receiving the target user input includes receiving partially completed content of the human understandable language message while the user drafts it.

4. The method of claim 1, wherein the quantitative risk level value is a weighted average of individual risk score(s) for the dialogue context data set, the relationship data and the communication frequency information, respectively.

5. A computer program product comprising:

a non-transitory machine readable storage device; and computer code stored on the non-transitory machine readable storage device, with the computer code including instructions for causing a processor(s) set to perform operations including the following:

receiving user input indicating that a user should receive unintended recipient notifications to avoid sending a message by mistake;

receiving a dialogue context data set including information indicative of context of a chat dialogue of a current chat session between the user and a target user, information indicative of a relationship between the user and the target user, and information indicative of a frequency of communication between the user and the target user;

receiving, from the user, a user message data set in the form of a human understandable language message proposed to be sent from the user to the target user as part of the current chat session;

detecting, by machine logic, a condition of the current chat session that the user likely intends to perform actions that will send a message through a communication device and a communication network to the target user;

responsive to detection of the condition, determining, by machine logic, a risk level value indicative of how likely that the target user is to be an unintended recipient with respect to the human understandable language message of the target user input based, at least in part, upon the dialogue context data set;

determining, by machine logic, that the risk level value is higher than a predetermined threshold;

responsive to the determination that the risk level value is higher than a predetermined threshold, presenting the user, through the communication device and the communication network, a notification including information indicating that the user may be in the process of sending the user message data set to an unintended recipient based, at least in part, on the determined risk level value; and stopping the sending of the user message data set to the target user based, at least in part, on the notification;

wherein:

the risk level value is one of: (i) qualitative, or (ii) quantitative;

the qualitative risk level value is a value from the following list: (i) no risk, (ii) low, (iii) medium, (iv) high, (v) very high; and the quantitative value is a numerical value indicative of likelihood of the target user being an unintended recipient.

6. The product of claim 5 wherein the determining that the target user is likely to be an unintended recipient further includes extracting keywords from the human understandable language message of the target user input and the dialogue context data set and comparing the keywords from each source for similarity.

7. The product of claim 5 wherein the receiving the target user input includes receiving partially completed content of the human understandable language message while the user drafts it.

8. The product of claim 5, wherein the quantitative risk level value is a weighted average of individual risk score(s) for the dialogue context data set, the relationship data and the communication frequency information, respectively.

9. A computer system comprising:

a processor(s) set;

a machine readable storage device; and computer code stored on the machine readable storage device, with the computer code including instructions for causing the processor(s) set to perform operations including the following:

receiving user input indicating that a user should receive unintended recipient notifications to avoid sending a message by mistake;

receiving a dialogue context data set including information indicative of context of a chat dialogue of a current chat session between the user and a target user, information indicative of a relationship between the user and the target user, and information indicative of a frequency of communication between the user and the target user;

receiving, from the user, a user message data set in the form of a human understandable language message proposed to be sent from the user to the target user as part of the current chat session;

detecting, by machine logic, a condition of the current chat session that the user likely intends to perform actions that will send a message through a communication device and a communication network to the target user;

responsive to detection of the condition, determining, by machine logic, a risk level value indicative of how likely that the target user is to be an unintended recipient with respect to the human understandable language message of the target user input based, at least in part, upon the dialogue context data set;

determining, by machine logic, that the risk level value is higher than a predetermined threshold;

responsive to the determination that the risk level value is higher than a predetermined threshold, presenting the user, through the communication device and the communication network, a notification including information indicating that the user may be in the process of sending the user message data set to an unintended recipient based, at least in part, on the determined risk level value; and stopping the sending of the user message data set to the target user based, at least in part, on the notification;

wherein:

the risk level value is one of: (i) qualitative, or (ii) quantitative;

the qualitative risk level value is a value from the following list: (i) no risk, (ii) low, (iii) medium, (iv) high, (v) very high; and the quantitative value is a numerical value indicative of likelihood of the target user being an unintended recipient.

10. The system of claim 9 wherein the determining that the target user is likely to be an unintended recipient further includes extracting keywords from the human understandable language message of the target user input and the dialogue context data set and comparing the keywords from each source for similarity.

11. The system of claim 9 wherein the receiving the target user input includes receiving partially completed content of the human understandable language message while the target user drafts it.

12. The system of claim 9, wherein the quantitative risk level value is a weighted average of individual risk score(s) for the dialogue context data set, the relationship data and the communication frequency information, respectively.

* * * * *